United States Patent
Inoue

(10) Patent No.: US 7,510,130 B2
(45) Date of Patent: Mar. 31, 2009

(54) FLUID DEVICE HAVING AN ORIFICE APERTURE AND METHOD OF CHANGING THE APERTURE SIZE OF SUCH AN ORIFICE APERTURE

(75) Inventor: Tsutomu Inoue, Owariasahi (JP)

(73) Assignee: Fuji BC Engineering Co., Ltd., Nagoya (JP)

( * ) Notice: Subject to any disclaimer, the term of this patent is extended or adjusted under 35 U.S.C. 154(b) by 133 days.

(21) Appl. No.: 10/310,466

(22) Filed: Dec. 5, 2002

(65) Prior Publication Data

US 2004/0079813 A1   Apr. 29, 2004

(30) Foreign Application Priority Data

Oct. 25, 2002   (JP)   ............................. 2002-311911

(51) Int. Cl.
 *B05B 1/00*   (2006.01)
(52) U.S. Cl. ...................... 239/600; 239/143; 239/338; 261/119.1; 261/121.1; 261/124
(58) Field of Classification Search .................. 138/40, 138/44; 137/205.5; 239/338, 341, 346, 143, 239/339, 364–369, 370, 600; 261/77, 78.2, 261/119.1, 121.1, 124, DIG. 65
See application file for complete search history.

(56) References Cited

U.S. PATENT DOCUMENTS

| | | | | |
|---|---|---|---|---|
| 677,852 | A | * | 7/1901 | Donnelly ...................... 261/77 |
| 1,152,458 | A | * | 9/1915 | Crozier et al. .................. 127/12 |
| 2,458,256 | A | * | 1/1949 | Crozier et al. ............. 261/18.2 |
| 2,766,912 | A | * | 10/1956 | Calamai ...................... 222/195 |
| 3,077,307 | A | * | 2/1963 | Moore et al. ................. 239/338 |
| 3,921,672 | A | * | 11/1975 | Arnold .......................... 138/42 |
| 4,119,686 | A | * | 10/1978 | Conger, IV ................... 261/77 |
| 4,759,505 | A | * | 7/1988 | Delaplace et al. ............. 239/85 |

FOREIGN PATENT DOCUMENTS

| | | |
|---|---|---|
| DE | 85 23 175.4 | 11/1986 |
| DE | 39 39 992 | 6/1991 |
| DE | 91 09 175.6 | 11/1991 |
| DE | 199 26 381 | 11/2000 |
| JP | 63-80398 | 5/1988 |
| JP | 08-054093 | 2/1996 |
| JP | 3219753 | 8/2001 |
| JP | 2002-156052 | 5/2002 |

\* cited by examiner

*Primary Examiner*—Christopher S Kim
(74) *Attorney, Agent, or Firm*—Jordan and Hamburg LLP

(57) ABSTRACT

A method provides in a fluid device an orifice aperture having an exact aperture size and easy changeability of that size. While being brought into communication with a connecting pipe through an intersecting inner aperture drilled in a lower plate of a device main body, two inner apertures with their one ends opening to a recessed portion are each provided with a female thread. An orifice member provided with a through-hole having an inside diameter corresponding to an orifice aperture and communicating with a hexagon socket into which a hexagon bar spanner wrench is internally fit, is threaded into each female thread whereby the orifice member is mounted. Finally, a covering member is sealingly threaded into an opening of the other end of each inner aperture. Air supplied from the connecting pipe passes through the through-hole serving as the orifice aperture and is blown into oil stored within the recessed portion from an end opening. Replacement orifice members with respective through-holes having different inside diameters may be prepared.

5 Claims, 9 Drawing Sheets

FLUID DEVICE HAVING AN ORIFICE APERTURE AND METHOD OF CHANGING THE APERTURE SIZE OF SUCH AN ORIFICE APERTURE

BACKGROUND OF THE INVENTION

1. Technical Field of the Invention

The present invention relates in general to a fluid device having, at a part of a fluid flow path thereof, an orifice aperture and to a method of changing the aperture size of such an orifice aperture. The invention relates in particular to a technique capable of facilitating not only orifice aperture formation but also orifice aperture size alteration.

2. Description of the Related Art

Various types of conventional fluid devices have been known in the art. One such fluid device employs, at some part of its flow path, an intervening orifice aperture. In cases where a flow path is composed of, for example, a duct line of pipes, orifice aperture formation is carried out by interposing a special-purpose connecting component provided with an orifice aperture between pipes and by connecting both ends of the connecting component to these pipes, respectively. On the other hand, in cases where a flow path is formed by drilling a hole in a block body of metal or other material, an orifice aperture is formed by performing drilling in such a way that a part of the hole has a diameter smaller than that of the remaining other part.

One such orifice aperture-formed fluid device is a mist generating device descried in Japanese Patent Gazette No. 3219753. In this mist generating device, a space hermetically zone-formed in the inside of a container is filled with liquid (for example, lubricant) up to a preselected level and gas (for example, air) is blown into the liquid through a nozzle, whereby a mist is generated in a space above the surface of the liquid. In order to increase the pressure at which air is blown into the liquid through the nozzle, a throttling portion (i.e., an orifice aperture) having a given diameter is formed in an air flow path of the nozzle.

SUMMARY OF THE INVENTION

When an orifice aperture is formed along a pipe arrangement by the use of the above-described special-purpose connecting component, operations for forming an orifice aperture at a part of a flow path of a fluid device of the above-described type are not very difficult to carry out. However, when an orifice aperture is formed by drilling, such orifice aperture forming operations will be extremely difficult to carry out. In addition, once an orifice aperture is formed and put to use, it is practically impossible to change the aperture size of the orifice aperture to a different aperture size.

In other words, when forming an orifice aperture by drilling a hole in a block body, the following operations are required. First, the block body is drilled partway from one side to form a first hole having a normal flow path diameter. Then, the block body is drilled partway from the other side to form a second hole having the same diameter as the first hole. Thereafter, with an intermediate portion of the block body (i.e., a portion defined between the first hole and the second hole) left undrilled, a drill tool of a fine diameter corresponding to the aperture size of an orifice aperture to be drilled is inserted into one of the first and second holes for drilling a fine diameter aperture through the intermediate portion. As a result, the first and second holes come to communicate with each other. In such fine diameter aperture formation, positioning is a troublesome operation. Besides, drill run-out may result in formation of a hole whose diameter is greater than a design value. Therefore, forming an orifice aperture of an exact inside diameter requires difficult operations. Furthermore, the distance to the intermediate portion is limited to a length shorter than the length of a drill tool used. If the distance is too long, this will cause drill run-out, thereby making it difficult to form an orifice aperture of an exact inside diameter.

Additionally, if the need for orifice aperture size alteration arises after a fluid device provided with an orifice aperture was put to use, it is still possible to make a change in the orifice aperture size in some way when the above-described special connecting component is employed. However, it is necessary to disconnect the existing connecting component and to remove fixed pipes on the both sides for replacement with another orifice member. As a result of this, it is practically impossible to make changes in the orifice aperture size. Further, in cases where an orifice aperture is formed by drilling a hole in a block body, as described above, it is practically impossible to make a change in the orifice aperture size because the block body, fixedly connected to other component parts, is assembled integrally to the fluid device. Accordingly, it is necessary to produce and provide fluid devices identical in construction with each other but having different orifice aperture sizes.

Bearing in mind the above-described problems, the present invention was made. Accordingly, an object of the present invention is to provide a fluid device and a method of changing the aperture size of an orifice aperture with a view to making it possible to form an orifice aperture of an exact inside diameter without any difficulty and to change the aperture size of an orifice aperture with ease.

A problem-solving means employed in a first invention is a fluid device having a flow path through which a fluid flows. In the fluid device of the first invention, in order to form an orifice aperture of a desired small diameter at a specific location of the flow path, a separately-formed orifice member provided with a through-hole having an inside diameter corresponding to the orifice aperture is mounted fluidtightly and detachably on an inner peripheral surface of the flow path at the specific location.

According to the first invention, an orifice aperture itself is implemented by an orifice member formed separately from the fluid device. This makes it possible to easily and exactly form a through-hole having an inside diameter corresponding to the orifice aperture formed in the orifice member. Since such an orifice member is mounted fluidtightly on the inner peripheral surface of the flow path, this makes it possible to easily and surely form an orifice aperture of an exact inside diameter at a specific location of the flow path. Additionally, since the orifice member is mounted detachably on the inner peripheral surface of the flow path, this makes it possible to easily make a change in the orifice aperture size just by replacing the already-mounted orifice member with another orifice member having a different orifice aperture size.

A second invention provides a problem-solving means which is premised on a fluid device comprising: a device main body; a mist generating chamber, hermetically zone-formed in the inside of the device main body, for storing a liquid up to a preselected level; a gas blowing opening which is provided at a bottom portion of the device main body so as to open in the stored liquid; and a mist leading-out opening which is provided at a top portion of the device main body so as to open toward a space above the surface of the stored liquid. In other words, in order to form an orifice aperture for inside diameter restriction at a specific location of a flow path through which a gas is supplied to the gas blowing opening, a separately-formed orifice member provided with a through-hole having an inside diameter corresponding to the orifice aperture is mounted fluidtightly and detachably on an inner peripheral surface of the flow path at the specific location.

According to the second invention, gas is blown into the stored liquid through the gas blowing opening. And then the gas moves upwards in the stored liquid in the form of gas bubbles and is ejected out from the surface of the stored liquid. The gas bubbles ascend from the surface of the stored liquid toward a space above the mist generating chamber, together with a mist comprising the stored liquid. The mist is led out through the mist leading-out opening. The gas, supplied from the gas blowing opening and governing mist creation, is accelerated by the orifice aperture formed in the gas flow path, thereafter being blown into the stored liquid. Since the orifice aperture is implemented by the use of an orifice member formed as a separate component from the fluid device, this makes it possible to easily and exactly form a through-hole having an inside diameter corresponding to the orifice aperture formed in the orifice member. Since the orifice member is mounted fluidtightly on the inner peripheral surface of the flow path, this makes it possible to easily and surely form an orifice aperture having an exact inside diameter at a specific location of the flow path. As a result, it becomes possible to perform gas blowing as designed, and mist creation as designed can be obtained without fail. Additionally, since the orifice member is mounted detachably on the inner peripheral surface of the flow path, this further makes it possible to easily make a change in the orifice aperture size just by replacing the already-mounted orifice member with another orifice member having a different orifice aperture size. This therefore makes it possible to make a change in the amount of gas to be blown out as well as in the amount of mist to be created.

The following configuration may be employed as a concrete means for fluidtightly and detachably mounting an orifice member according to either the first invention or the second invention on the inner peripheral surface of the flow path. In other words, a portion to be engaged is preformed in the inner peripheral surface of the flow path at the specific location. On the other hand, an engaging portion capable of fluidtightly and detachably engaging with the to-be-engaged portion, and an engagement operation portion for engagement operation positioned between the engaging portion and the to-be-engaged portion are formed in an outer peripheral surface of the orifice member.

With the aid of the engagement operation portion, the engaging portion of the orifice member engages the to-be-engaged portion formed at the specific location, whereby the orifice member is fluidtightly and detachably mounted on the inner peripheral surface of the flow path. In this case, by virtue of engagement operation by the engagement operation portion, the orifice member can be mounted easily on the inner peripheral surface of the flow path. Besides, the orifice member can be detached easily from the inner peripheral surface of the flow path by disengaging the engagement with the aid of the engagement operation portion. The existing orifice member can be replaced easily with another orifice member by newly performing engagement operation. Here, it may be arranged such that the to-be-engaged portion is a female thread and the engaging portion is a male thread, whereby the orifice member will be mounted fluidtightly and detachably on the inner peripheral surface of the flow path by thread fastening. In this case, the orifice member can be mounted fluidtightly on the inner peripheral surface of the flow path by threading the engaging portion into the to-be-engaged portion (by thread fastening) with the aid of the engagement operation portion. On the other hand, the once-mounted orifice member can be detached easily from the inner peripheral surface of the flow path by loosening the thread fastening. Therefore, orifice member replacement can be made easily by newly threading another orifice member provided with an orifice aperture having a different diameter into the inner peripheral surface of the flow path so that the orifice member and the inner peripheral surface are thread-fastened together.

Further, it may be arranged such that the fluid device according to either the first invention or the second invention further comprises a working aperture which opens outside and extends straightway to the specific location of the flow path and a covering member for sealing, in an openable/closable manner, an opening portion of the working aperture. The orifice member is inserted into the working aperture from the opening portion and is mounted detachably at the specific location. In this case, the covering member is opened and the orifice member is inserted into the working hole from the opening portion until it reaches the specific location. In this way, the orifice member is mounted with ease. After the orifice member is mounted, the covering member is placed in the closed state to close the flow path. The flow path becomes hermetically closed. On the other hand, operations of removing the existing orifice member can be carried out easily through the working hole by placing the covering member in the open state, and the removed orifice member can be taken out of the opening portion of the working hole without trouble. A replacement orifice member can be mounted in the same way, thereby providing easy orifice member replacement. It should be noted that by "in an openable/closable manner", what is meant is that the covering member is detachably mounted or that the covering member fixedly mounted is capable of being placed in an open or closed state.

It may be arranged such that the fluid device according to either the first invention or the second invention further comprises a separately-formed replacement orifice member provided with an orifice aperture having an inside diameter different from that of the orifice aperture of the aforesaid existing orifice member. In other words, such a replacement orifice member is pre-assembled to the fluid device, regardless of whether the need for a change in the orifice aperture size will arise. Such arrangement makes it possible to select an orifice aperture size on a case-by-case basis depending upon the circumstances. For example, it becomes possible to select an orifice aperture size in accordance with the intended use. Therefore, it is possible to form an orifice aperture of a desired aperture size in each case. Particularly when the aforesaid arrangement is applied to the second invention, it becomes possible to selectively change, on a case-by-case basis, the degree at which the gas which is blown into the stored liquid through the gas blowing opening is accelerated as the need arises. Therefore, it becomes possible to readily change and control the amount of mist which is led out through the mist leading-out opening without having to use other pressure controlling means.

Further, it may be arranged such that the fluid device according to either the first invention or the second invention further comprises two or more flow paths and shut-off members which are mounted fluidtightly and detachably at specific locations of the flow paths so that the flow paths are shut off at the specific locations, wherein either a shut-off member or an orifice member is selectively disposed at the specific location of each flow path. If all the flow paths are provided with orifice members, this makes it possible to form orifice apertures at specific locations of all of the flow paths. On the other hand, if only selected flow paths are provided with orifice members and the other remaining flow paths are provided with shut-off members, this makes it possible to form orifice apertures in only the selected flow paths. In this way, it is possible to change the number of orifice apertures to be formed in accordance with the intended use or in accordance with the application circumstances, even in the same fluid device.

A third invention employs the following problem-solving means which is a method of changing the aperture size of an orifice aperture. More specifically, the method according to the third invention is a method of changing, in a fluid device having an orifice aperture for inside diameter restriction at a specific location of a flow path through which a fluid flows, the aperture size of the orifice aperture to a different orifice aperture size. In other words, a separately-formed orifice member provided with a through-hole having an inside diameter corresponding to the orifice aperture is mounted fluidtightly and detachably on an inner peripheral surface of the flow path at the specific location, to form the orifice aperture. As the orifice member, two or more replacement orifice members having through-holes of different inside diameters are prepared in advance. Orifice member replacement, in which after removal of the already-mounted orifice member another orifice member provided with a through-hole having an inside diameter different from that of the detached orifice member is newly mounted at the specific location, is carried out, thereby making a change in orifice aperture size.

The third invention provides a concrete aperture size changing method capable of readily and surely changing the aperture size of an orifice aperture formed by an orifice member, in the fluid device of the first invention.

A fourth invention provides the following problem-solving means which is an aperture size changing method for a fluid device comprising: a device main body; a mist generating chamber, hermetically zone-formed in the inside of the device main body, for storing a fluid up to a preselected level; a gas blowing opening which is provided at a bottom portion of the device main body so as to open in the stored liquid; a mist leading-out opening which is provided at a top portion of the device main body so as to open toward a space above the surface of the stored liquid; and an orifice aperture, for inside diameter restriction, provided at a specific location of a flow path through which a gas is supplied to the gas blowing opening. In other words, a separately-formed orifice member provided with a through-hole having an inside diameter corresponding to the orifice aperture is disposed fluidtightly and detachably on an inner peripheral surface of the flow path at the specific location for orifice aperture formation. In this case, as the orifice member, two or more replacement orifice members having through-holes of different inside diameters are prepared in advance. Orifice member replacement, in which after removal of the already-mounted orifice member another orifice member provided with a through-hole having an inside diameter different from that of the detached orifice member is newly disposed at the specific location, is carried out, thereby making a change in orifice aperture size.

The fourth invention provides a concrete aperture size changing method capable of readily and surely changing the aperture size of an orifice aperture formed by an orifice member, in the fluid device of the second invention.

The orifice aperture of each of the above-described inventions is implemented by a through-hole formed in an orifice member. However, it should be noted that the orifice aperture is just a concept including a "throttle" and a "throttling portion" formed in a part of a flow path, irrespective of the implications of the term "orifice aperture" itself. In other words, the term "orifice aperture" includes every means that can be employed with the aim of increasing the pressure or the speed of fluid (gas or liquid) and of producing a drop in the pressure of the fluid by forcing the liquid to pass through a small cross-sectional portion which is so formed in a part of a fluid flow path as to have a smaller inner cross section in comparison with the other portions, regardless of the term differences.

Further, each of the above-described inventions is suitably applied to cases where a flow path is formed mainly by drilling and an orifice aperture is formed in a part of the flow path. However, each of the above-described inventions is applicable to cases where a flow path is defined by an internal space of a conduit pipe.

BRIEF DESCRIPTION OF THE DRAWINGS

FIG. 2, comprised of FIG. 2(a) and FIG. 2(b), is an enlarged cross sectional diagram of an orifice member of FIG. 1, wherein FIG. 2(a) shows an initially-mounted orifice member whereas FIG. 2(b) shows a replacement orifice member;

DETAILED DESCRIPTION OF THE PREFERRED EMBODIMENTS

Hereinafter, embodiments of the present invention will be described with reference to the accompanying drawing figures.

Figure 1:
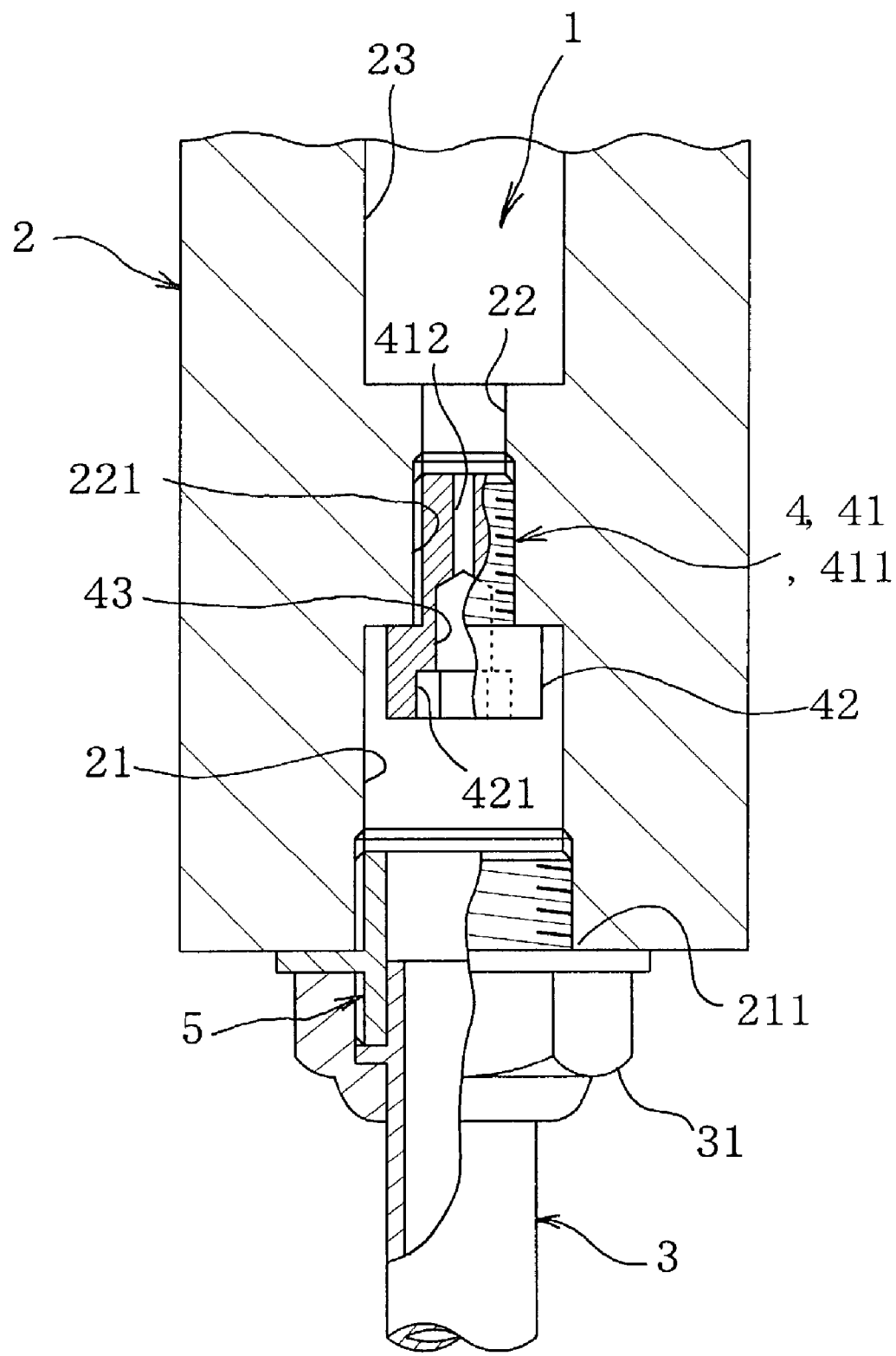
FIG. 1 is a partially sectional explanatory diagram showing a part of a flow path of a fluid device according to an embodiment of the present invention.

Referring first to FIG. 1, there is illustrated a part of a fluid device according to a first embodiment of the present invention. FIG. 1 shows a flow path 1 through which fluid (gas or liquid) flows. The flow path 1 is provided, at a specific location thereof, with an orifice aperture.

The flow path 1 comprises inner apertures 21, 22, 23 drilled in a block body 2 and an internal space of a piping member 3 which is connected to the block body 2 in such a way that the piping member 3 establishes communication with the inner aperture 21. The inner aperture 21 is formed by drilling from one side (the lower side of FIG. 1) of the block body 2, having a predetermined diameter. On the other hand, the inner aperture 23 is formed by drilling from the other side (the upper side of FIG. 1) of the block body 2, having the same diameter as the inner aperture 21. The inner aperture 22 for allowing the both inner apertures 21, 23 to communicate with each other is formed by drilling, having an inside diameter corresponding to a screw shank portion 41 of an orifice member 4. The inner aperture 22 is provided, at its inner peripheral surface, with a female thread 221 serving as a portion to be engaged. Such a part of the inner aperture 22 at which the female thread 221 is formed constitutes the specific location.

In addition, the piping member 3 and the block body 2 may be connected together by appropriate connecting means known in the art. The Figure shows an example in which the piping member 3 is fixedly connected to the block body 2 by threading a fixing nut 31 on the side of the piping member 3 into a connecting joint 5 fixedly threaded into the inner aperture 21 of the block body 2.

As shown in FIG. 2(a), the orifice member 4 is made up of the screw shank portion 41 and a head portion 42 whose outside diameter is smaller than the inside diameter of the inner aperture 21. The orifice member 4 is shaped like a round head hexagon socket bolt, when viewed as a whole. The screw shank portion 41 is provided, at its outer peripheral surface, with a male thread 411 which is threaded into the female thread 221. Further, drilled in the inside of the screw shank portion 41 is a through-hole 412 having an inside diameter corresponding to a predetermined orifice aperture size. A hexagon socket 421 serving as an engagement operation portion is formed in the head portion 42. The through-hole 412 communicates with the hexagon socket 421. In addition, in the example depicted in the Figure, an intermediate aperture 43 having a intermediate diameter between the diameter of the hexagon socket 421 and the diameter of the through-hole 412 is defined between the hexagon socket 421 and the through-hole 412. More specifically, the intermediate aperture 43 is formed in such a position that it extends over the head portion 42 and the screw shank portion 41. It should be noted that the intermediate aperture 43 is not necessarily formed. The provision of the intermediate aperture 43 may be omitted accordingly.

Figure 3:
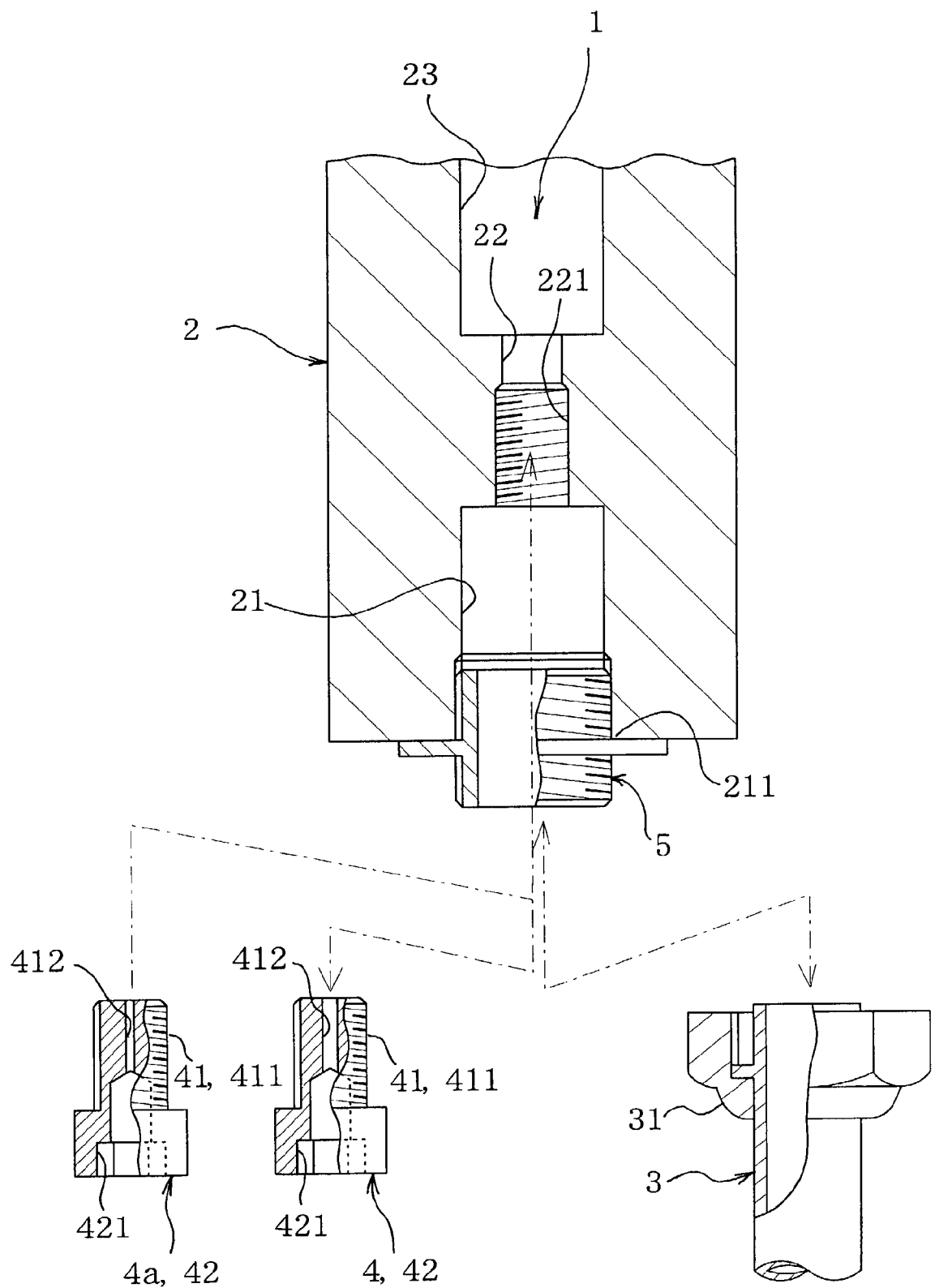
FIG. 3 is a diagram corresponding to FIG. 1 for describing, in an exploded manner, mounting and replacing operations.

The fluid device of the present embodiment is formed by placing the orifice member 4 into the inner aperture 22. More specifically, as shown in FIG. 3, the orifice member 4 is held temporarily by internally fitting, for example, the nose of a hexagon bar spanner wrench into the hexagon socket 421. With the orifice member 4 temporarily held by the wrench, the orifice member 4 is passed through an opening portion 211 of the inner aperture 21 formed in one end surface (the lower end surface in FIG. 1) of the block body 2 (or an inner aperture of the connecting joint 5) so that the orifice member 4 is inserted into the inner aperture 21. Thereafter, the orifice member 4 is threaded into the female thread 221 of the inner aperture 22 by turning the hexagon bar spanner wrench. When the orifice member 4 is threaded completely into the female thread 221, the orifice member 4 is mounted, in a fluid-tight manner, on the inner peripheral surface of the inner aperture 22. As a result of this, the through-hole 412 of the orifice member 4 constitutes an orifice aperture. The piping member 3 is fixedly connected to the block body 2 to complete formation of the fluid device.

Figure 2:
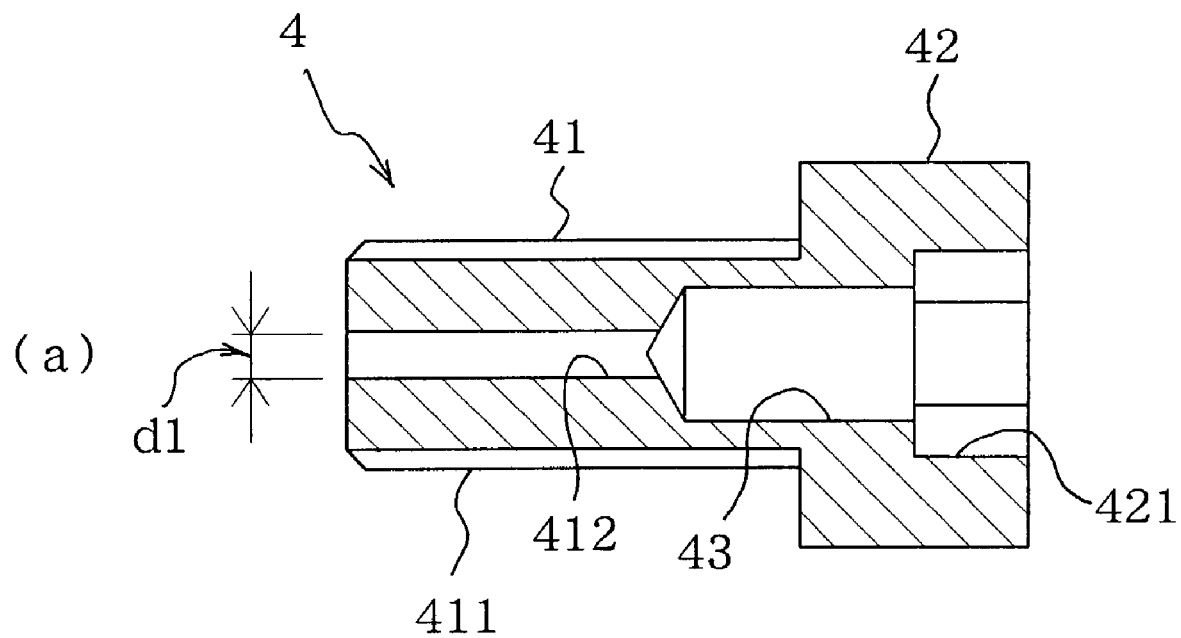
Figure 2:
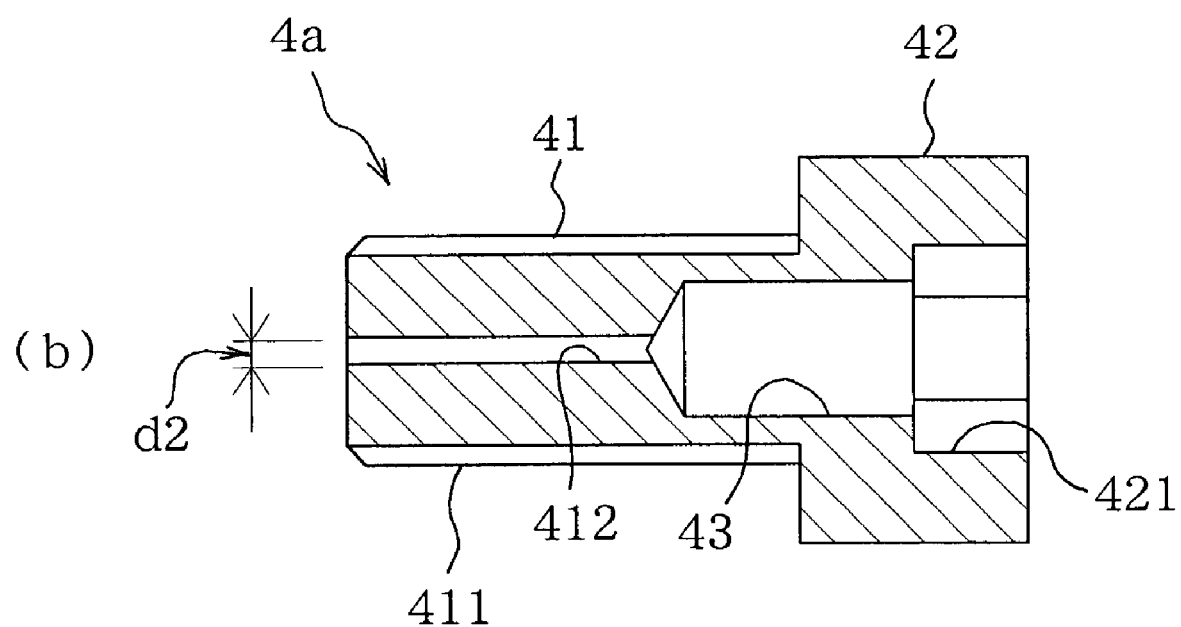

On the other hand, when the need for a change in the aperture size of the orifice aperture arises, such a change can be made by replacing the existing orifice member 4 with a replacement orifice member 4a shown as an example in FIG. 2(b). The replacement orifice member 4a is completely identical in construction with the orifice member 4, with the exception that the inside diameter of the through-hole 412 of the replacement orifice member 4a (d2) differs from the inside diameter of the through-hole 412 of the orifice member 4 (d1). In addition, in FIG. 2, the relationship between these inside diameters is: d2<d1; however, the relationship may be the other way around (i.e., d2>d1). Alternatively, two or more replacement orifices 4a . . . having different inside diameters may be preformed.

The existing orifice member 4 will be replaced with the orifice member 4a in the following way. In the first place, the piping member 3 is dismounted. In the next place, a hexagon bar spanner wrench is internally fit into the hexagon socket 421 of the orifice member 4. Then, the spanner wrench is turned in an unfastening direction. As a result of this, the orifice member 4 is disengaged from the inner aperture 22. The orifice member 4 is taken out from the inner aperture 21. Thereafter, the hexagon bar spanner wrench is internally fit into the hexagon socket of the replacement orifice member 4a. The orifice member 4a is mounted in the inner aperture 22 in the same way that the orifice member 4 was mounted. As a result of this, an orifice aperture having an inside diameter of d2 is formed. To sum up, it is possible to make a change in the orifice aperture size (i.e., the size of the through-hole 412) at any stage.

Figure 4:
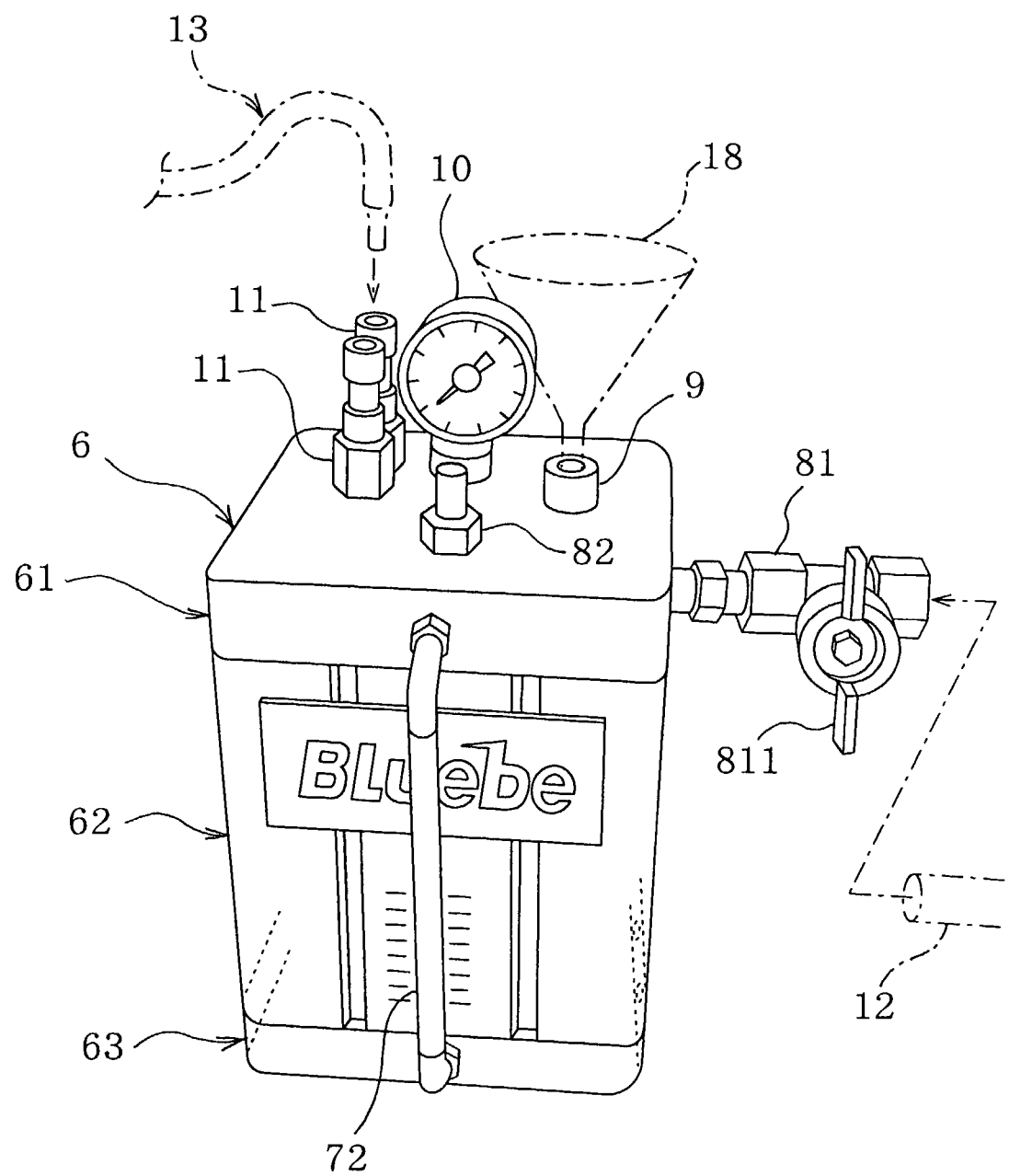
FIG. 4 is a perspective view showing an external appearance of a lubricant applicator serving as a fluid device according to a second embodiment of the present invention.
Figure 5:
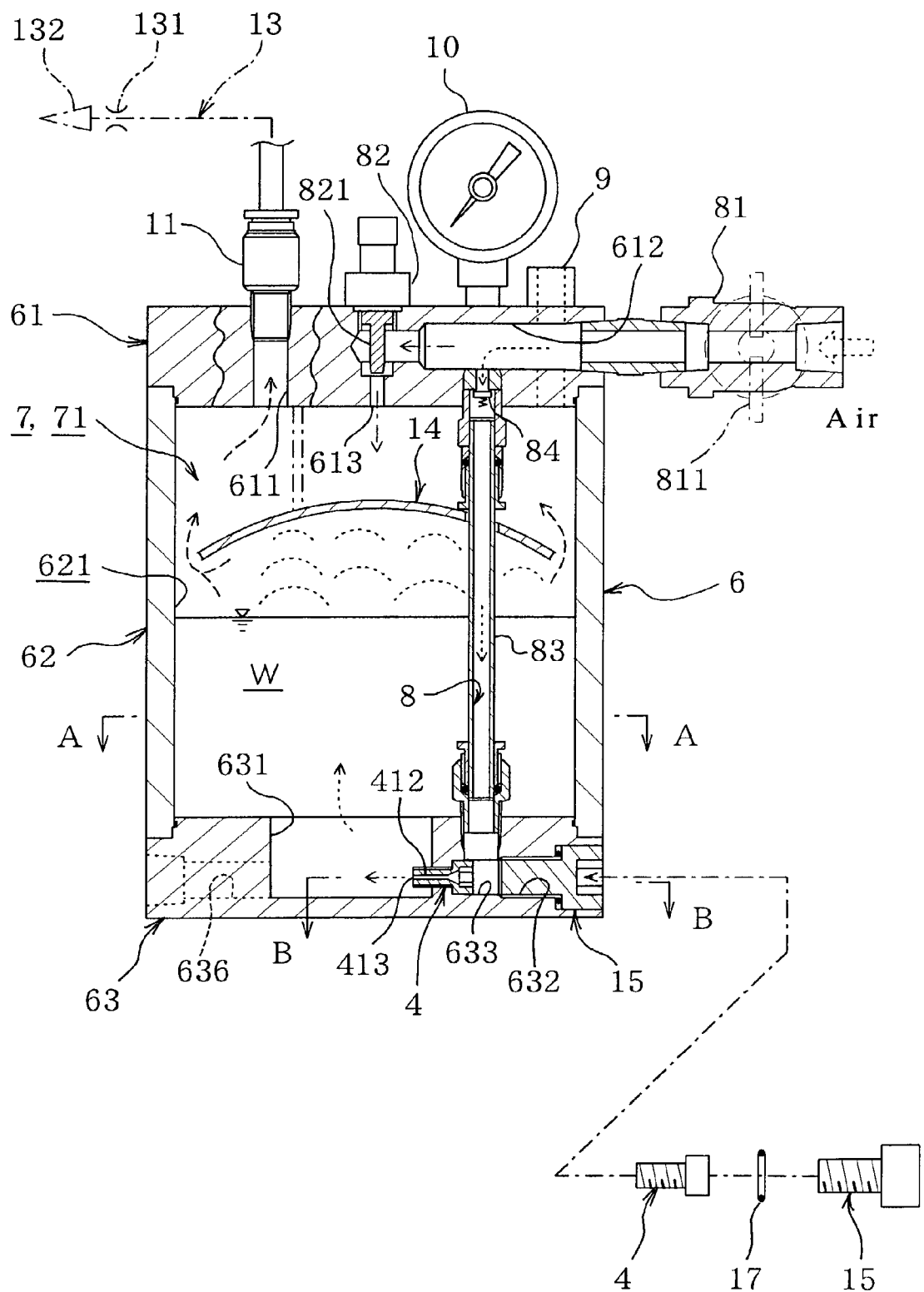
FIG. 5 is a vertical sectional explanatory diagram of the lubricant applicator of FIG. 4.

Referring to FIGS. 4 and 5, there is shown a lubricant applicator serving as a fluid device according to a second embodiment of the present invention. The lubricant applicator of the second embodiment comprises: a device main body 6 including an upper plate 61, a body cylinder 62 and a lower plate 63 as a block body; a mist generating chamber 7, hermetically zone-formed in the inside of the device main body 6, for storing an oil W (e.g., lubricant or cutting oil) up to a preselected level (see FIG. 5); a gas blowing opening 413 which is an end opening of the through-hole 412 of the orifice member 4, the gas blowing opening 413 being provided in the lower plate 63 of the device main body 63 so as to open in the stored oil W; and a mist leading-out opening 611 which is provided in the upper plate 61 of the device main body 6 so as to open toward a space 71 above the surface of the storage oil W. Further, FIG. 4 shows a level meter 72 for checking the level of the stored oil W.

As shown mainly in FIG. 5, the upper plate 61 is provided with: an air delivery connecting member 81 fixed so as to project laterally and including an opening/closing switching valve 811; an oilhole 9 with a plug which penetrates vertically for establishing communication with the mist generating chamber 7; a pressure indicator 10 for pressure measurement and indication of the inner pressure of the mist generating chamber 7; an air controlling valve 82 employing for example a needle valve 821 for control of the internal pressure of the mist generating chamber 7; lead-out connecting members 11, 11 communicatively connected to the mist leading-out opening 611; and a connecting pipe 83 extending downward to the lower plate 63 through the inside of the mist generating chamber 7.

An air delivery aperture 612 is formed in the upper plate 61 by drilling. Air from the air delivery connecting member 81 in communication with one end of the air delivery aperture 612 is emitted, through the air controlling valve 82 disposed at the other end of the air delivery aperture 612, into the mist generating chamber 7. At the same time, the air is delivered, through a check valve 84 and the connecting pipe 83, toward the lower plate 63 from the intermediate position. In addition, an air delivery pipe 12 (see FIG. 4) extending from an air pressure source is connected to the air delivery connecting member 81.

Further, connected to each connecting member 11 is a lubrication tube 13 implemented by for example a flexible tube. Atomized lubricant led through the mist leading-out opening 611 is fed through the lubrication tube 13. After having passed through a throttling part 131 (see FIG. 5) located just before an end of the lubrication tube 13, the atomized lubricant is discharged, through an end nozzle 132, to a target to be lubricated. Such a lubrication target is for example a cutting tool. Preferably, the end nozzle 132 is a flexible nozzle for the sake of convenience for lubrication position control.

Figure 6:
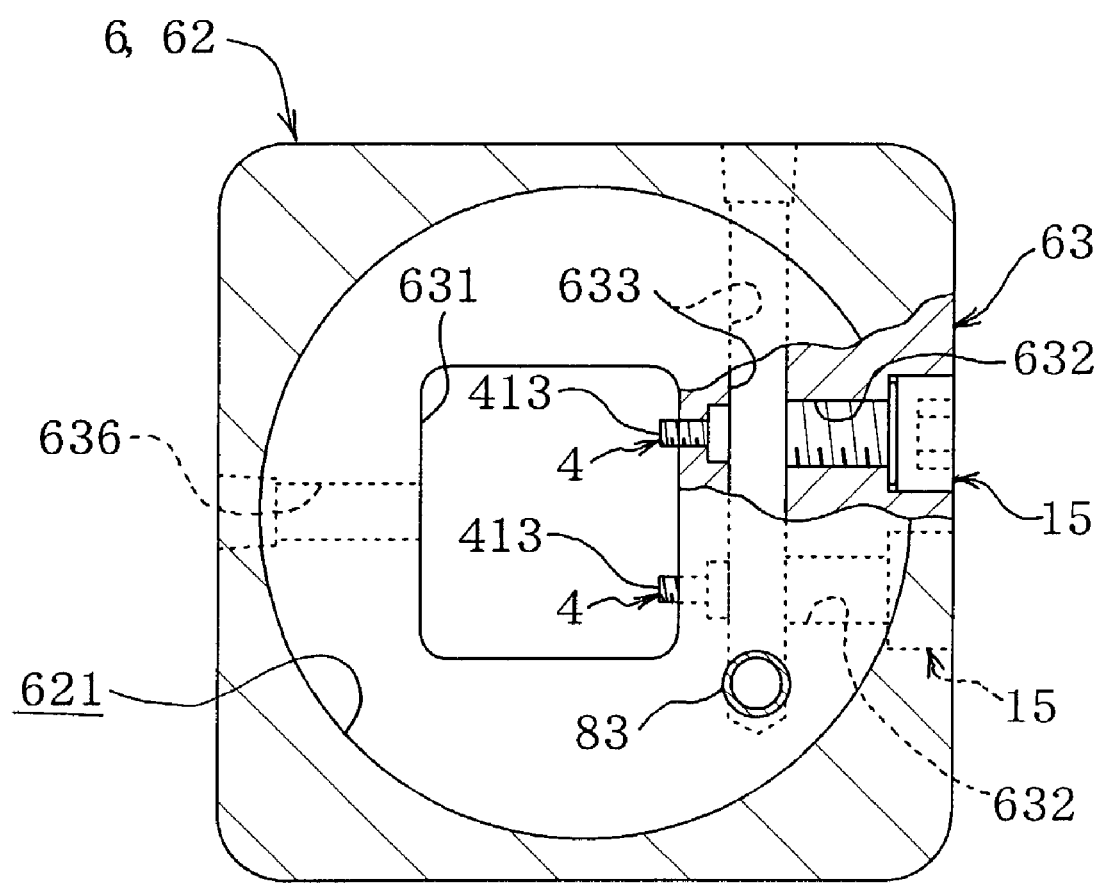
FIG. 6 is a sectional explanatory diagram taken along the lines A-A of FIG. 5.

As shown in FIG. 6, the body cylinder 62 has, as its inner surface side, a cylindrical surface 621. A partition 14 (see FIG. 5), shaped like a dome roof such as an inverted bowl, is supported, in a suspended manner, in the space 71 above the mist generating chamber 7 zoned by the cylindrical surface 621. The position of the partition 14 is fixed. More specifically, the partition 14 is disposed vertically apart from a preselected level of the storage oil W by a specified distance determined by the relationship between the blowing flow rate or the blowing pressure of air from the gas blowing opening 413 and the inner pressure setting of the mist generating chamber 7 based on the inner pressure control by the air controlling valve 82. The partition 14 may be a flat plate.

Figure 7:
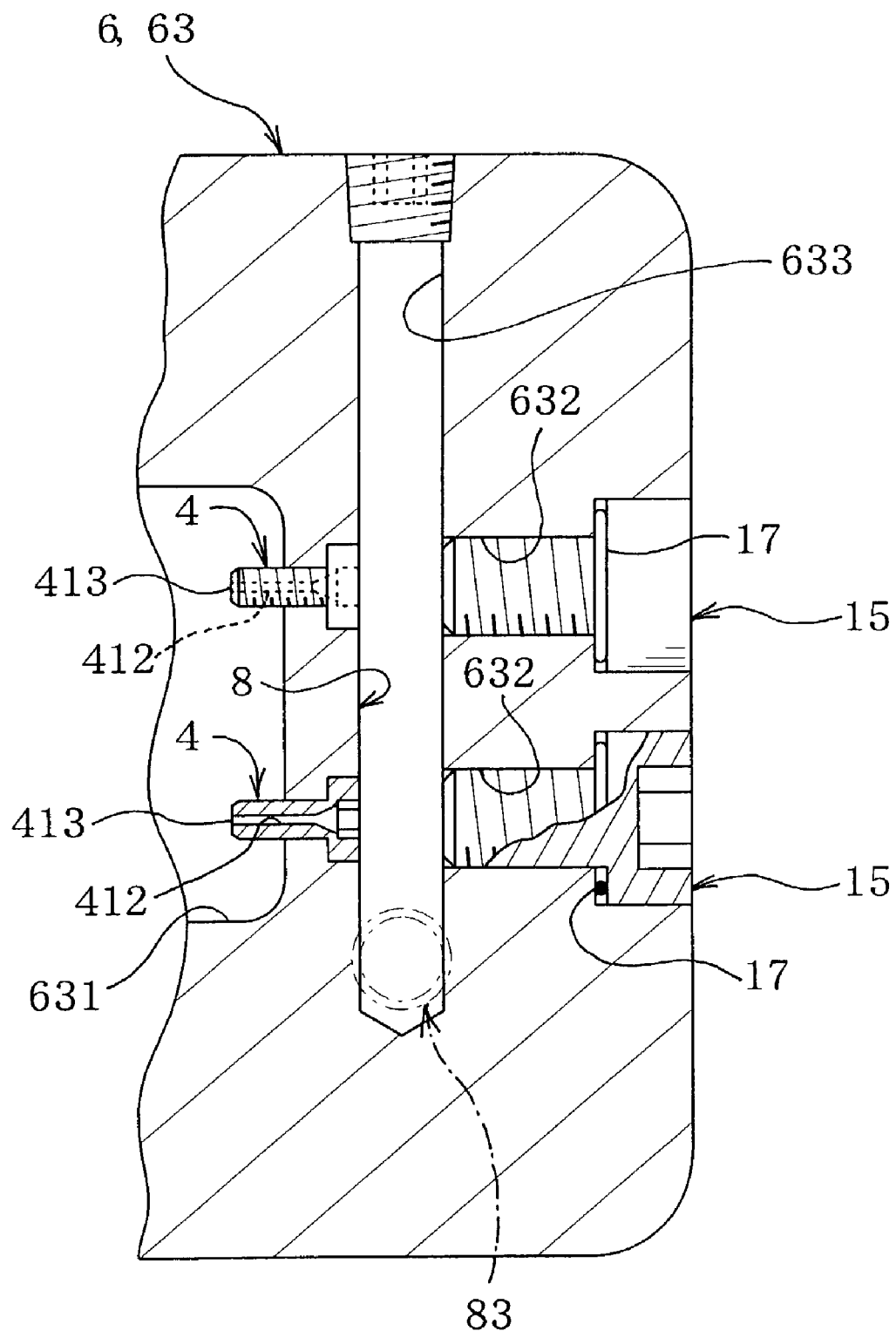
FIG. 7 is a sectional explanatory diagram taken along the lines B-B of FIG. 5.
Figure 8:
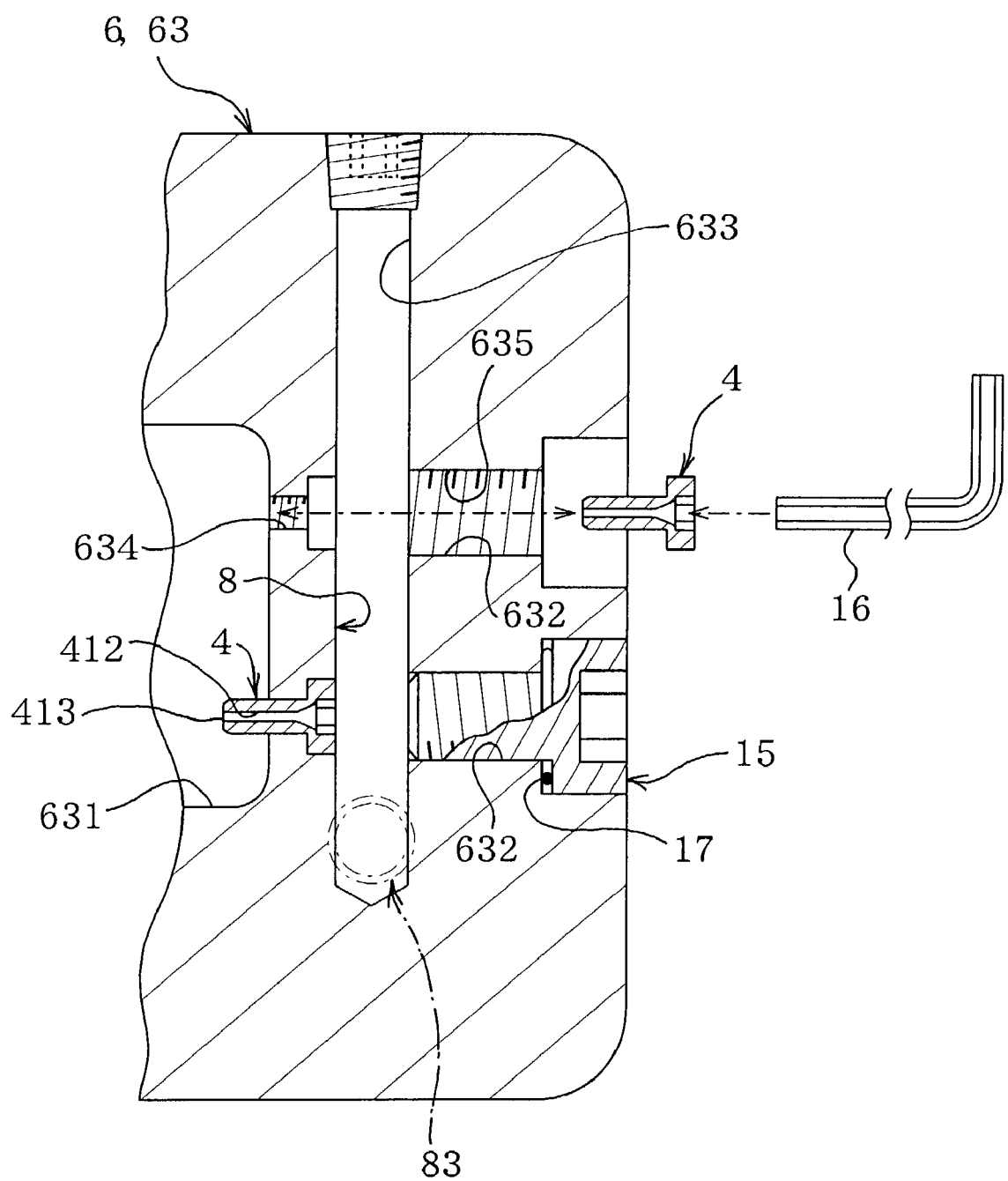
FIG. 8 is a diagram corresponding to FIG. 7 showing, in a one-side exploded manner, mounting and replacing operations.

As shown in FIGS. 6-8, a recessed portion 631 opening to the mist generating chamber 7 is formed centrally in the lower plate 63. Further, drilled in the lower plate 63 are (a) two inner apertures 632, 632 passing between the recessed portion 631 and an outer surface on one side of the lower plate 63 (a right-hand side outer surface in each Figure) and (b) an intersecting inner aperture 633 which intersects orthogonally with both the inner apertures 632, 632, communicates with the both inner apertures 632, 632, and communicates with the connecting pipe 83 at the inner end. Each inner aperture 632 is sectionalized into two sections. More specifically, each inner aperture 632 is provided, in one of these two sections on the side of the recessed portion 631 located opposite across the intersecting inner aperture 633 from the other section on the outer surface side, with a female thread 634 (shown only in FIG. 8) serving as a to-be-engaged portion capable of threadably engaging with the screw shank portion 41 of the orifice member 4. On the other hand, the outer surface side section is provided with a female thread 635 (shown only in FIG. 8). The female thread 635 has an inside diameter greater than the outside diameter of the head portion 42 of the orifice member 4 and capable of threadably engaging with a covering member 15 which is a hexagon socket bolt.

A hexagon bar spanner wrench 16 (see FIG. 8) is used to thread the orifice member 4 having the same construction as the one shown in the first embodiment into the section of each inner aperture 632 located on the side of the recessed portion 631. Thereafter, the covering member 15 is threaded into the outside surface side section with another hexagon bar spanner wrench proper for the size of the covering member 15. As a result of this, orifice apertures are easily formed by the through-holes 412 of the orifice members 4, 4, and submerged nozzles are formed. The gas blowing opening 413 is formed by an end opening of each through-hole 412. In other words, the section of each inner aperture 632 located on the side of the recessed portion 631 forms a specific location in the inside of a flow path 8 which will be described later, whereas the outside surface side section forms a working aperture. The reference numeral 17 denotes an O-ring held against the head of the covering member 15 for sealing. The reference numeral 636 is a drain aperture which is sealed by a plug under normal conditions.

In the above-described lubricant applicator, lubrication is carried out as follows. The oilhole 9 is opened. Lubricant is fed to the mist generation chamber 7 with for example a funnel 18 (see FIG. 4). In this way, the mist generation chamber 7 is filled with the oil W up to a preselected level. Thereafter, air is supplied by placing the opening/closing switching valve 811 in the opening state. During this period, the needle valve 821 of the air controlling valve 82 remains in the closed state. The needle valve 821 is placed in the opening state if necessary, so that the internal pressure of the mist generating chamber 7 is controlled by changing the flow rate of air passing through the air controlling valve 82. As a result, the supplied air, after passing through the air flow path 8 made up of the air delivery aperture 612, the connecting pipe 83, the intersecting inner apertures 633 and the through-holes 412 of the orifice members 4, 4, is blown into the bottom of the stored oil W through the gas blowing openings 413. As a result of this, numerous air bubbles move upward in the stored oil W, thereafter blowing out toward the upper space 71 from the surface of the stored oil W in the form of mist, together with oil bubbles. These oil bubbles come into collision with the partition 14, in other words the partition 14 stands in the way of the ascending oil bubbles. As a result, a part of the oil bubbles becomes an oil mist, whereas the remaining part changes to oil droplets and falls. Passing through a clearance defined between the partition 14 and the cylindrical surface 621, the oil mist ascends and is delivered, through the mist leading-out opening 611, into the lubrication pipe 13. Thereafter, the oil mist is emitted through the end nozzle 132 for lubrication.

During the above-described lubrication, the internal pressure of the mist generating chamber 7 is maintained at a preselected level by control of the balance between (a) resistance produced mainly by the throttling portion 131 of the lubrication pipe 13, (b) blowing of air from the gas blowing openings 413, 413 based on the orifice apertures and (c) emission of air for internal pressure control by the air controlling valve 82. By maintaining the internal pressure of the mist generating chamber 7 at a preselected level, an amount of mist corresponding to the preselected internal pressure level is generated, whereby an amount of oil corresponding to the preselected internal pressure level is finally emitted through the end nozzle 132 to lubricate a lubrication target.

On the other hand, when there is a need for a change in the inside diameter of the orifice aperture (the through-hole 412) of the gas blowing opening 413 for increasing the discharge rate of lubricant from the lubrication pipe 13 (i.e., the lead-out amount of mist from the mist leading-out opening 611), each existing orifice member 4 is replaced with another replacement orifice member (for example the orifice member 4a shown in FIG. 2(b)) provided with a through-hole 412 having a required diameter. This replacement procedure is carried out as follows. In the first place, each covering member 15 is loosened and removed. The hexagon bar spanner wrench 16 is inserted into the open inner aperture 632 to loosen and remove the existing orifice member 4. Next, the replacement orifice member is threaded into the inner aperture 632. The replacement procedure is completed by threading the covering member 15 into the inner aperture 632 to seal it. Therefore, the aperture size of the once-formed orifice aperture (the through-hole 412) can be changed in any later stage (for example, any stage after the lubricant applicator was put to use). Besides, orifice aperture size alteration can be carried out easily.

The present invention is limited in its application to neither the first embodiment nor the second embodiment. The present invention includes various other embodiments. For example, the head portion 42 of the orifice member 4 (4a) may be omitted. In other words, the orifice member 4 (4a) may be formed only of the screw shank portion 41. In this case, a hexagon socket or the like is formed in one side of the screw shank portion 41 as an engagement operation portion. Further, it is sufficient that a projection or a recess for rotation operation is formed as an engagement operation portion. For example, a groove shaped like the minus sign (−) or a groove shaped like the plus sign (+) is formed and engagement of the orifice member is performed with a flat head screwdriver or Phillips screwdriver.

Further, in the second embodiment, the two inner apertures 632 serving as working apertures and constituting specific locations of the flow path 8 are formed and the two orifice members 4, 4 are mounted, whereby orifice apertures are formed by the through-holes 412 of the orifice members 4, 4. Alternatively, it may be arranged such that a single inner aperture 632 is formed and a single orifice member 4 is mounted therein to form a single orifice aperture. Further, it may be arranged such that three or more inner apertures 632 are formed and orifice members 4 are mounted in these inner apertures 632 to form three or more orifice apertures. When forming only a single orifice aperture, the intersecting inner aperture 633 may be omitted. In such a case, the connecting pipe 83 is brought into direct communication with the single inner aperture 632.

Figure 9:
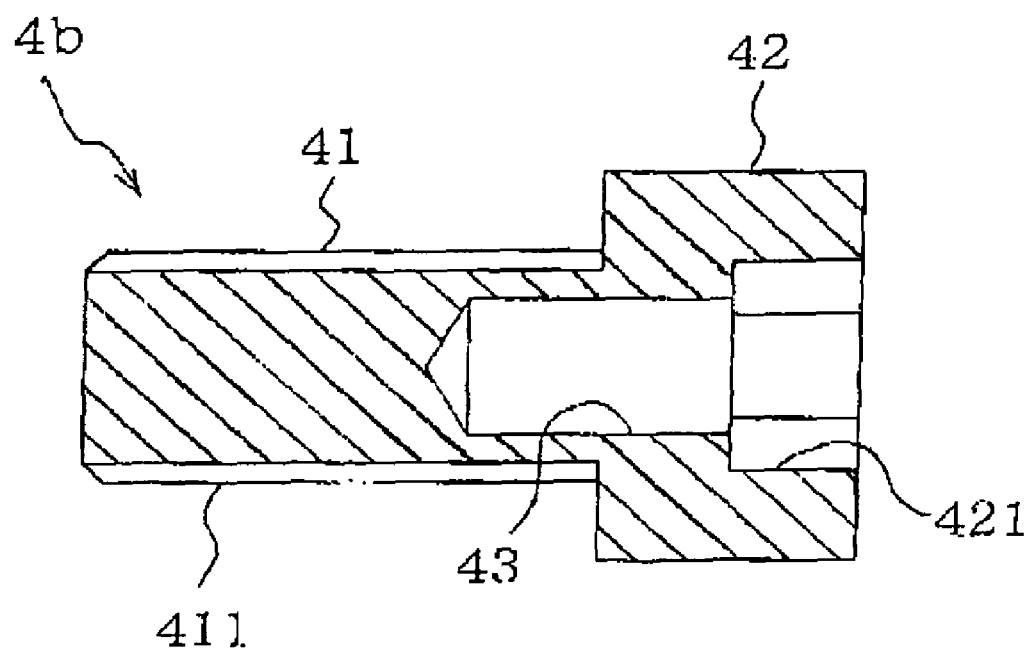
FIG. 9 is an enlarged cross sectional diagram of a shut-off member.

Furthermore, in the second embodiment, a plug member for shutting off the flow path 8 (a shut-off member which can be, in place of the orifice member 4, mounted fluidtightly and detachably at a specific location of the flow path) is preformed for future use and the orifice member 4 is replaced with such a plug member, thereby allowing the user to select and employ various applications as required. In other words, as the plug member (the shut-off member), a plug member which is identical in shape with the orifice member 4 and which is provided with no through-hole 412 is formed. The shut-off member 4b is illustrated in FIG. 9 and includes the identical structural detail as the orifice member 4, except for the through-hole 412, so that the shut-off member includes the screw shank 41, the male thread 411, the head portion 42, the hex socket 421 and the intermediate aperture 43 as described with the orifice member 4.

Such a plug member is threaded into the female thread 634 of one of the inner apertures 632 and is mounted therein, whereby the side of the mist generating chamber 7 of the one inner aperture 632 is shut off. And, the orifice member 4 is threaded into the female thread 634 of the other inner aperture 632 and is mounted therein, thereby forming an orifice aperture. The two inner apertures 632 are previously provided so that two orifice apertures can be formed. This makes it possible to form two orifice apertures as required. Alternatively, it is possible to select and employ another application in which only one orifice aperture is formed and the other inner aperture 632 is shut off by a plug member. To sum up, it is possible to make a change in the orifice aperture size. Further, it is possible to nor only change the number of orifice apertures at any later stage but also facilitate the operation of changing the number of orifice apertures.

What is claimed is:

1. A mist generating chamber comprising:
   a shell comprised of a top wall, a bottom wall opposing said top wall, and one or more side walls extending from said top wall to said bottom wall, said top, bottom and one or more side walls defining an internal cavity for storing liquid, said top wall being a lid, and said bottom wall being a base lower plate having a thickness defined by an area between an inner surface of said base lower plate which forms a surface of said internal cavity and an outer surface of said base lower plate which forms an exterior surface of said shell, said cavity being hermetically zone-formed, said shell including a mist outlet disposed in said lid;
   a tube for supplying gas to said cavity, said tube including a downstream end that terminates in a passage within said thickness area between said inner and outer surfaces of said base lower plate;
   said base lower plate having first and second interior orifices within said thickness of said area between said inner and outer surfaces of said base lower plate, said first and second interior orifices connecting said internal cavity with said passage, said first and second interior orifices both being spaced in said passage from said downstream end of said tube;
   first and second plugs mounted fluidtightly and detachably in respective ones of said first and second interior orifices so that said plugs are spaced in said passage from said downstream end of said tube, said first and second plugs having cavity ends that are within said internal cavity, said cavity ends being proximal to said inner surface of said bottom wall;
   said base lower plate having first and second exterior orifices within said thickness area between said inner and outer surfaces of said base lower plate, said first and second exterior orifices extending from said first and second interior orifices to said outer surface of said base lower plate for providing access to respective ones of said first and second plugs, said first and second exterior orifices both being spaced from said downstream end of said tube;
   wherein said first and second plugs are capable of being installed and removed from said base lower plate without contacting said downstream end of said tube; and
   each of said plugs comprising either a through-hole having a first inside diameter for passing gas from said passage to said cavity or a solid core for forming a shut-off member that prevents gas from passing from said passage to said cavity.

2. The device of claim 1, further comprising third and fourth plugs mounted fluidtightly and detachably in respective ones of said first and second exterior orifices, said third and fourth plugs being solid core plugs.

3. The device of claim 2, wherein each of said plugs is threadedly mounted into a respective one of said orifices.

4. The device of claim 3, wherein each of said orifices comprises a female thread and each of said plugs comprises a male thread.

5. The device of claim 1, wherein said tube is comprised of a connecting pipe that extends from said lid to said base lower plate.

* * * * *